Patented Aug. 16, 1927.

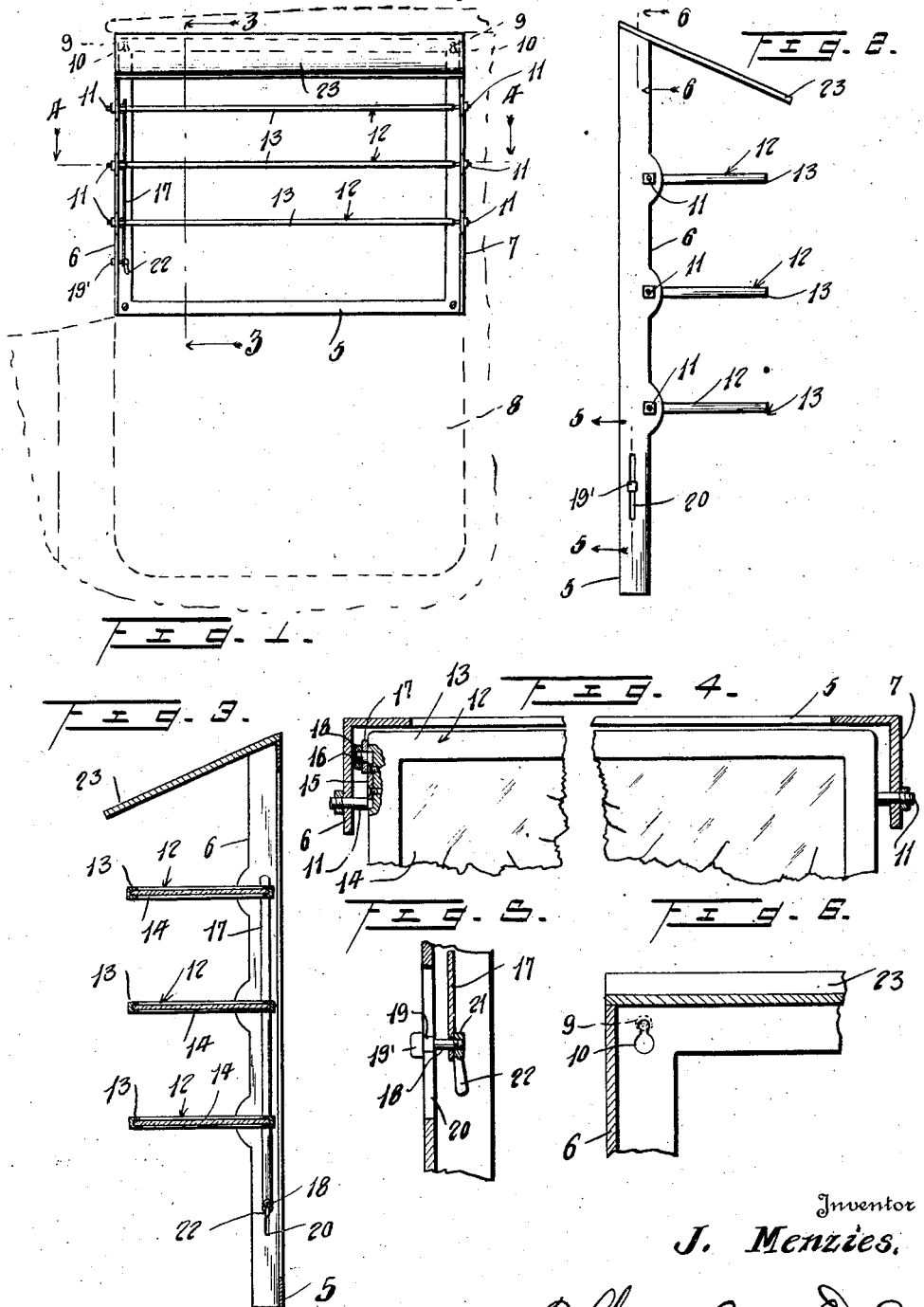

1,639,413

UNITED STATES PATENT OFFICE.

JOHN MENZIES, OF FRESNO, CALIFORNIA.

AUTOMOBILE SUNSHADE ATTACHMENT.

Application filed July 20, 1926. Serial No. 123,769.

This invention has reference to sun shade attachments for automobiles and has for its object the provision of a device of this character adapted to be attached to the door of an automobile of closed type, to enable the occupants of the automobile to regulate or prevent the passage of sunrays through the windowed upper half of the door.

Another object of the invention is to provide a device of this character which is capable of functioning as a rain shield to exclude rain from the interior of the automobile when the movable transparent panel forming the window of the upper half of the door is in open or lowered position.

Other purposes, advantages and characteristic features of the invention will be more adequately appreciated from the accompanying drawings and the following description thereof.

Figure 1 is a side view of my invention as applied to an automobile, the latter being shown in dotted outline.

Figure 2 is a front edge view of the invention disclosed in Figure 1.

Figure 3 is a vertical sectional view taken along the line 3—3 of Figure 1.

Figure 4 is a longitudinal sectional view taken along the line 4—4 of Figure 1.

Figure 5 is a sectional view taken along the line 5—5 of Figure 2 and

Figure 6 is a further sectional view taken along the line 6—6 of Figure 2.

Proceeding now to a more detailed discussion of the drawings, 5 designates a rectangular frame formed with parallel side flanges 6 and 7 adapted to extend vertically in the applied position of the frame which is shown to advantage in Figure 1 in which it will be noted that the lower horizontal member of the frame is screwed or otherwise secured to the outer surface of the door 8 at about the upper portion of the lower half of the door, the upper horizontal member of the frame being attached to the upper edge portion of the door. In practice I prefer to provide the last mentioned portion of the door with headed bolts or studs 9 shown in dotted outline in Figures 1 and 6 and adapted to enter slots 10 formed in the upper member of the frame, these slots being preferably elongated vertically and restricted at their upper ends so that in applying the frame the studs 9 are first passed through the enlarged lower ends of the slots and the frame then permitted to slide downwardly to engage the shanks of the studs in the upper restricted portion of the slots and in this position the heads of the studs being wider than the upper portions of said slots serve to prevent outward movement of the frame with respect to the door while permitting removal of the frame to be quickly accomplished upon detachment of the fastening device holding the lower member of the frame to the door.

The side flanges 6 and 7 serve to rotatably support the trunnions 11 of a plurality of sunshades in the form of panels 12 which may include an outer metal frame 13 enclosing an opaque center 14 of celluloid or other similar material colored or otherwise treated to function as glare excluding screens. The trunnion at one end of each panel is formed as an integral extension of a plate 15 screwed or otherwise fastened to the frame 13 of the panel and equipped at the end remote from said trunnion with a lug 16. The several lugs 16 are connected together by an actuating bar 17 apertured to receive the lugs therethrough and held in place by suitable nuts 18 threaded on to the outer ends of the lugs. At its lower end the actuating bar is apertured to receive therethrough the shank of a bolt 18 having a flattened portion 19 movable vertically in a guide slot 20 formed in the adjacent flange 6 of the frame. At its outer end the bolt is equipped with a suitable head 19′ engaging said flange and is threaded at its inner end to receive thereon the nut portion 21 of a handle member 22.

Secured to the top of the frame above the uppermost panel 12 is a stationary panel 23 inclining downwardly and outwardly therefrom and consisting of a single sheet of any suitable non-transparent material such as metal or the like.

With reference to the use of the invention it will be evident, from the foregoing, that the panels 12 may be adjusted to various positions of angular inclination by movement of the actuating bar 17 in a vertical direction and that the bolt 18 and handle member 22 afford means for securing said panels in any selected position of adjustment. In this connection it may be explained that when the handle member 22 is turned about the bolt 18 in a tightening direction the resulting pressure exerted by the nut portion 21 of the handle member on the actuating bar 17 together with the pressure exerted by the bolt head on the flange 6 serves to prevent casual movement of the bolt in the slot 20. When the handle member is turned in the reverse direction to lessen the binding engagement between the parts the bolt 18, carrying the actuating bar 17, may be freely moved in the slot 20 to position the panels as desired and the handle member then turned in a tightening direction.

From the foregoing it is manifest that I have provided a very simple and efficient sun shade attachment for the doors of closed automobiles which can be conveniently adjusted from within the automobile to exclude or regulate the entrance of sun rays through the windowed upper half of the door. Another advantage of my invention is that, is case of rain, it is not necessary, when the weather is warm, to close the upper half of the door by raising the glass window usually provided for this purpose as, with my invention, the rain may be excluded in the open position of said window by disposing the panels 12 at a sufficiently acute angle to the door to exclude the rain while permitting entrance of air in sufficient quantities to maintain the interior of the automobile comparatively cool and comfortable.

Having thus disclosed what I now conceive to be a preferred embodiment of my conception I reserve the right to resort to such desired changes as come within the spirit and scope of the invention as defined by the appended claims.

What I claim is:

1. A sun shade attachment for automobile doors comprising a rectangular frame open at the center and provided with side flanges, a plurality of panels extending transversely across the center of the frame and equipped with terminal trunnions journalled in said flanges to provide a pivotal mounting for the panels, a vertically extending actuating bar mounted to lie inwardly of one of said side flanges and pivotally secured to each of said panels, a bolt having a head engaging the outer surface of said last-mentioned flange, a squared portion slidable in a vertical slot formed in said flange and a shank passing through an opening in said actuating bar, and a handle member threaded on said shank to bear against the inner side of said actuating bar, said handle being adjustable on the shank in the direction of the actuating bar to secure the latter and the panels in various positions of adjustment.

2. A sun shade attachment comprising a rectangular frame open at the center and provided with side flanges, a plurality of panels extending transversely across the open center of the frame, each of said panels having a trunnion at one end journalled in one of said side flanges and being provided at the other end with a plate having lateral projections of unequal length, the longer projection affording a trunnion adapted to be journalled in the remaining side flange of the frame, a vertically extending actuating bar provided with openings receiving the shorter projections of the said plates therethrough, nuts threaded on the terminal portions of said shorter projections to hold the actuating bar thereon and means for moving said bar vertically including provision for retaining said bar in different positions of adjustment.

3. A sun shade attachment of the character described comprising a frame, a panel extending transversely of the frame and pivotally mounted therein, a vertically extending actuating bar pivotally secured to said panel, a bolt having a head engaging the outer surface of one of the side members of the frame and a shank passing inwardly through a vertical slot formed in said side member, a portion of said shank being squared to engage the sides of the slot to prevent turning of the bolt therein, said actuating bar being provided with an opening receiving the shank therethrough and a handle member threaded on the shank and engageable with the actuating bar to hold the latter and the panel in different positions of adjustment.

In testimony whereof I hereunto affix my signature.

JOHN MENZIES.